Aug. 20, 1963  S. L. BURGWIN ET AL  3,101,424
CONTROL APPARATUS
Filed June 9, 1960
3 Sheets-Sheet 1

INVENTORS
STEPHEN L. BURGWIN
BY    CARL GREEN
Roger W. Jensen
ATTORNEY

Aug. 20, 1963  S. L. BURGWIN ET AL  3,101,424
CONTROL APPARATUS

Filed June 9, 1960  3 Sheets-Sheet 2

INVENTORS
STEPHEN L. BURGWIN
BY CARL GREEN

Roger W. Jensen
ATTORNEY

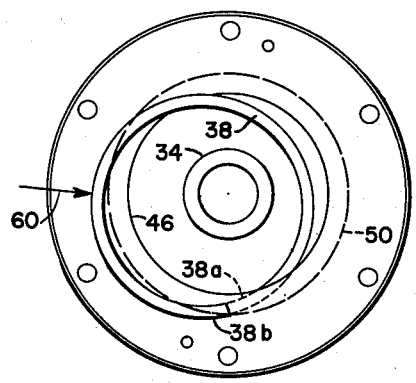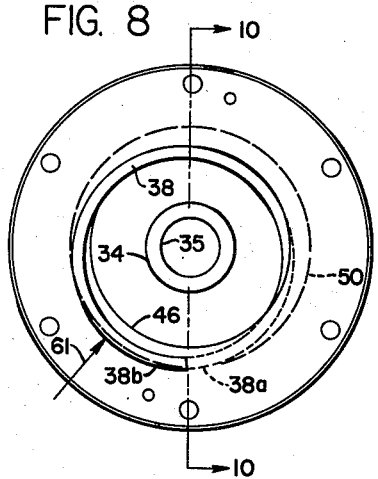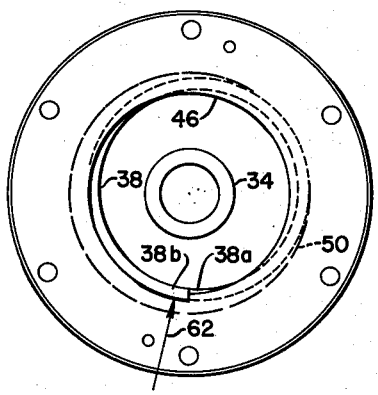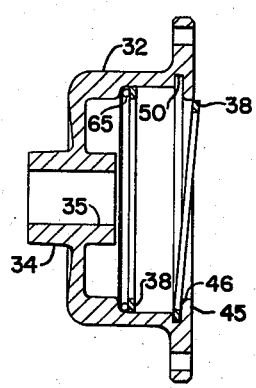

United States Patent Office 3,101,424
Patented Aug. 20, 1963

3,101,424
CONTROL APPARATUS
Stephen L. Burgwin, Clearwater, and Carl Green, Pinellas County, Fla., assignors to Minneapolis-Honeywell Regulator Company, Minneapolis, Minn., a corporation of Delaware
Filed June 9, 1960, Ser. No. 34,947
16 Claims. (Cl. 310—217)

The present invention pertains generally to the field of control apparatus and has specific although not exclusive utility in a gas bearing gyro spin motor. In a copending application of the applicants, assigned to the same assignee as the present invention, there is described and claimed a special type of gas bearing gyro spin motor having various unique features. One of its unique features is having a centrally positioned single thrust bearing means which more specifically includes a relatively stationary centrally positioned circular thrust plate member, the axial faces of which coact with axial end faces on a pair of end-bell members which form part of the rotor or rotor assembly. One of the advantages of our gas bearing gyro spin motor is that it has a very high "lift-to-drag" ratio, the importance of which is well understood by those skilled in the art. One of the significant features in obtaining a high lift-to-drag ratio is to keep the thrust bearing surfaces as close as possible to the spin axis. By doing this then the "drag" torque arm is minimized which in turn minimizes the drag of the motor.

The present invention is especially useful in a gas bearing gyro spin motor of the type shown in our copending application because it provides a means for inserting or assembling a motor rotor element into the end-bell portions of the motor without sacrificing the above described advantage of keeping the thrust bearing surfaces as close as possible to the spin axis. To explain in more detail, generally a motor of this type will have a relatively stationary stator element which will include lamination means and winding means placed thereon with the winding means being energized so as to produce a rotating magnetic field. Suitable means are provided in the rotor members for coacting with the rotating magnetic field so as to impart a torque to the rotor assembly. Various rotor torque producing arrangements may be used but one that is quite widely used in the field of gyroscopes is to have a "hysteresis" type of rotor element. Briefly a hysteresis type of rotor element is one wherein the rotor comprises at least in part one or more elements being characterized by having a high hysteresis coefficient. In operation the hysteresis rotor will tend to become "locked in" with the rotating magnetic field so that the rotor will operate or spin at the synchronous speed of the motor as is determined by the winding configuration (number of poles) and frequency of the source of energization to the windings.

The hysteresis elements shown in the motors depicted in our copending application are indicated to be laminated. The present invention provides a means for assembling one or more laminations with a rotor housing where the lamination has a dimension which at first glance would appear incapable of assembly with the housing member. More specifically, in one embodiment of the invention, a means is provided for assembling a plurality of ring-shaped laminations through a relatively open end of a rotor end bell where the outside diameter of the ring-shaped laminations is substantially greater than the diameter of the aperture through which the lamination must pass. The rotor end bell is provided with an internal circumferential recess having a diameter suitable for receiving the laminations. The present invention provides a means for inserting the laminations inside of the rotor end bell without any adverse stressing of permanent distorting of the laminations, it being understood that such violent treatment of the laminations will result in various detrimental effects such as changing the magnetic properties of the laminations. Briefly, the present invention provides a split ring type of lamination in combination with a "loading groove" substantially axially adjacent to the mouth of the rotor end bell. It will be demonstrated below that this combination provides a means of efficiently assembling a plurality of laminations together with a rotor end bell without sacrificing the desirable arrangement of having the thrust bearing surfaces as close as possible to the spin axis.

It is an object of this invention therefore to provide an improved control apparatus.

Another object of this invention is to provide a control apparatus comprising the combination of a hollow cylindrically shaped housing member and one or more split ring laminations, the housing member and the laminations being characterized in such a way that the housing member has a restricted opening, the dimension of which is less than the outer diameter of the lamination.

A further object of the invention is to provide an improved gas bearing gyro spin motor.

Other and more specific objects of the invention, including both constructional details and method of assembly, will be set forth more fully in and will become apparent from a reading of the following specification and appended claims in conjunction with the accompanying drawings in which:

FIGURES 7, 8 and 9 are sequential end views of the rotor end bell with a split ring lamination being shown in different positions relative to the housing according to the amount of the lamination inside of the housing; and FIGURE 10 is a cross-sectional view of the rotor end bell or housing as viewed along section lines 10—10 of FIGURE 8.

Figure 1:
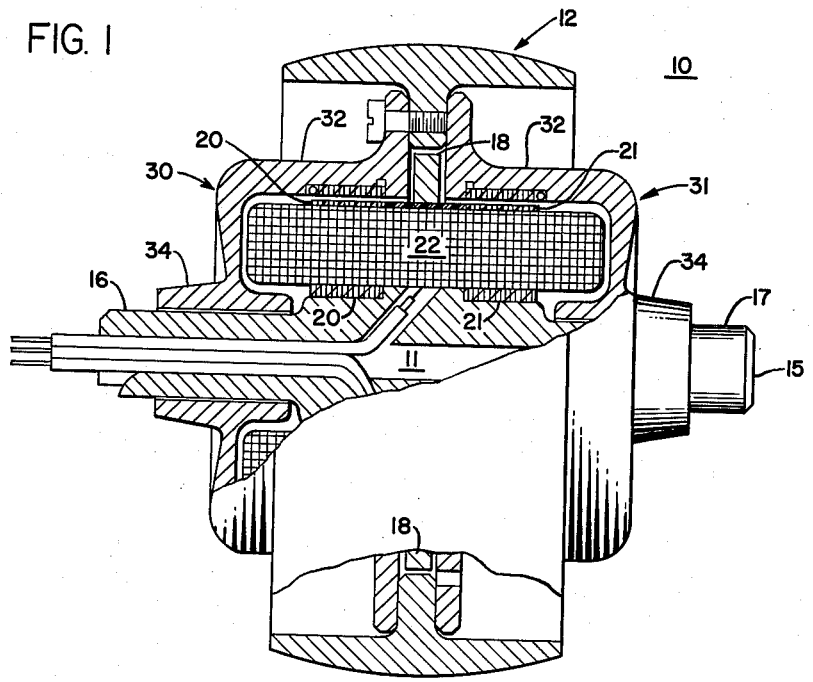
FIGURE 1 is a cross-sectional view of a gas bearing gyro spin motor incorporating the teaching of the present invention.

In FIGURE 1 the reference numeral 10 generally depicts a hydrodynamic or self-generating gas bearing gyro spin motor including a stator portion generally identified by the reference numeral 11 and a rotor assembly generally identified by the reference numeral 12. More specifically the stator assembly 11 includes a relatively stationary shaft member 15 having cylindrical or rounded or journal portions 16 and 17 adjacent the ends thereof and a centrally positioned radially extending thrust element or thrust plate 18.

The stator assembly 11 further includes laminated core means 20 and 21 positioned respectively on opposite sides of the thrust plate 18 and they have a common winding means 22 passing through suitable winding openings in both the core means and the thrust plate which are not specifically identified in the drawings. The configuration of the core means 20 and 21 and the configuration of the winding means 22 may be of any suitable type which when energized from a suitable source of energization will produce a rotating magnetic field of the desired synchronous speed. Generally the outer periphery of the core means 20 and 21 is substantially circular.

Figure 2:
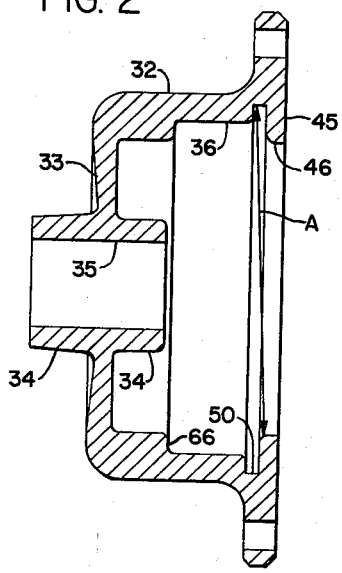
FIGURE 2 is a cross-sectional view of a typical rotor end bell.
Figure 3:
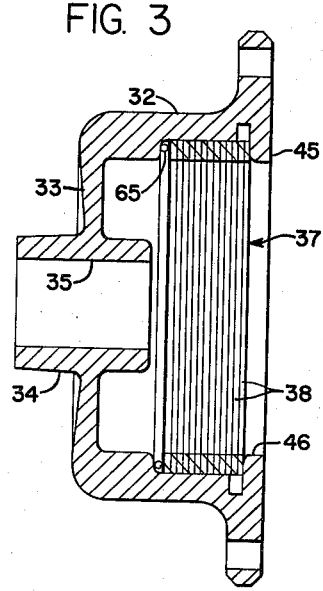
FIGURE 3 is a cross-sectional view of a typical rotor end-bell assembled with a plurality of split ring laminations.

The rotor assembly 12 comprises a pair of end bell members 30 and 31 which are substantially similar to one another. A typical end bell configuration is shown in FIGURES 2 and 3. Each end bell has an axially extending hollow drum or casing portion 32 one end of which is substantially closed off by an end wall or radial bearing portion 33 which generally extends radially inward and terminates in a hublike portion 34 of substantial axial length and having an axial bore 35 therethrough. The bore 35 is slightly larger in diameter than the cylindrical or journal portions 16 and 17 of the shaft member 15.

Figure 4:
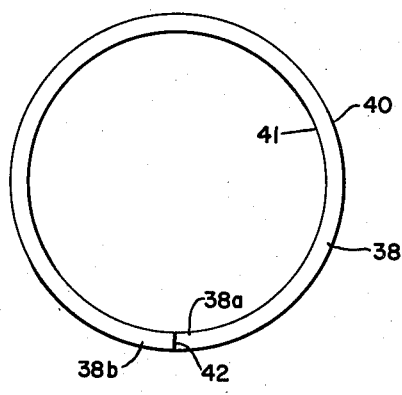
FIGURE 4 is a plan view of a typical split ring lamination.

Each of the end bells 32 is provided with an internal circumferential recess 36 adapted to receive an electric motor rotor element generally identified by the reference numeral 37 in FIGURE 3 and specifically depicted as a laminated structure. Each of the individual laminations is identified by the reference numeral 38 and a typical lamination 38 is depicted in plan view in FIGURE 4. The laminations 38 are known as "ring" laminations having an outer diameter 40 and an inner diameter 41. The laminations used in the present invention are characterized by being split radially at one point as at 42 (see FIGURE 4). The significance of the split 42 in the laminations 38 will become more appreciated below.

The end bells are further characterized by having means at the relatively open end thereof extending radially inwardly a substantial amount relative to the inner diameter of the end bell housings as defined by the circumferential recess 36. More specifically the end bells are characterized by having a lip or flange means 45 extending radially inwardly a substantial amount relative to the recess 36. As depicted the lip or flange 45 is a symmetrical means, the inner periphery of which preferably defines a circular aperture 46. As is readily apparent from an examination of FIGURE 2 the diameter of the aperture 46 is significantly less than the diameter of the recess 36 or inner diameter of the housing or end bell. The lip or flange 45 is further characterized by having a relatively short axial length the "inside" face of which is in communication with the inside of the end bell. It will be understood that the "outside" portion of the lip or flange constitutes an extension of the thrust bearing surface which is generally defined by the right axial face of the end bell as depicted in FIGURE 2. It will be understood that it would be relatively easy to assemble a plurality of ring-shaped laminations into the circumferential recess 36 of the end bells if the aperture 46 had substantially the same diameter as the inner diameter 36 of the housing. However, as has been demonstrated above, in some apparatus it is especially desirable to have the diameter of the aperture 46 significantly smaller than the inner diameter 36 of the housing. This is especially true in a gas bearing gyro spin motor where a high "lift-to-drag" ratio is very desirable and advantageous.

The end bells are further characterized by having an internal recess or loading groove within the housing substantially immediately axially adjacent to the lip means or flange means 45. The internal recess means or loading groove means is identified in FIGURE 2 by the reference numeral 50. The recess means or loading groove means 50 must satisfy two requirements in order for the present invention to be practiced. First, the loading groove 50 must have a sufficient axial extent so that it may receive a lamination. Preferably the axial extent of the loading groove 50 should be somewhat greater than the axial thickness of a single lamination and as depicted in FIGURES 1–3 is approximately twice the axial thickness of a lamination 38. The loading groove 50 may not be of less axial length than the axial thickness of a lamination. The second requirement of the recess means or loading groove means 50 is that it must be related to the size of the aperture 46. More specifically, the lip or flange means 45 (which defines the size of the aperture 46) and the recess or loading groove means 50 are characterized so that the dimension from a point within the recess to a point on the periphery of the aperture 46 180° circumferentially spaced therefrom is at least substantially the same as the inner diameter 36 of the housing. This in turn means that the required dimension is substantially the same as the outer diameter 40 of the individual laminations 38 since the outer diameter 40 of the laminations 38 is substantially the same as the inner diameter 36 of the housing or rotor end bell. In actual practice the diameter 36 would be slightly greater than the diameter 40 but the difference is so small that it is not detectable in the present drawings. This critical dimension is identified by the reference letter A in FIGURE 2.

The technique of assembling a lamination 38 with a rotor end bell is depicted sequentially in FIGURES 7–9. The first step is to axially displace the ends of a lamination the two ends being identified in FIGURE 4 by the reference numerals 38a and 38b. The second step is to insert one of the axially displaced ends into the hollow housing member through the aperture 46 and apply a gentle lateral force to the lamination so that the end of the lamination which is inside the housing is pressed against the bottom or outer periphery of the loading groove or recess means 50. As depicted in FIGURE 7 the first two steps of the assembling technique have been accomplished namely the axial displacement of the two ends 38a and 38b with end 38a having been inserted within the housing or end bell through the aperture 46. It should be emphasized that the axial displacement of the two ends of the lamination is very minor in that it is only necessary to displace the ends enough to clear the lip or flange means 45. Stated otherwise the axial displacement of the two lamination ends has to be equal to the axial thickness of the flange means 45. This type of axial displacement does not adversely stress or permanently deform in any respect or adversely affect the magnetic properties of its individual laminations since it is a relatively small deformation distributed over the entire circumferential extent of the individual laminations 38. Once the lamination is entirely inside of the housing, then the natural resiliency of the lamination will bring the two ends 38a and 38b back to their original abutting relationship.

In FIGURE 7 only a small portion of the lamination 38 has been inserted into or within the end-bell housing. More of the lamination is inserted within the housing by applying successive inward radial forces to the portion of the lamination remaining outside of the housing progressing toward the other of the ends of the lamination. For example in FIGURE 7 the radial force vector which would be used to insert more of the lamination 38 into the housing would generally be in the circumferential zone containing the arrow 60. This would tend to push more of the lamination into the housing so that it would take a position similar to that shown in FIGURE 8 where approximately 50 percent of the lamination is within the housing. The radial force needed to insert even more of the lamination into the housing from that shown in FIGURE 8 is depicted in FIGURE 8 by the arrow 61. The application of an inwardly directed radial force at the arrow 61 will tend to push or will tend to insert even more of the lamination into the housing taking a position such as is depicted in FIGURE 9 where almost all of the lamination is within the housing. The final application of radial force would be approximately at the point depicted by the arrow 62 in FIGURE 9. It will be observed that the arrows 60, 61 and 62 tend to progress toward the end of the lamination which remains outside of the housing. In FIGURE 10 which is a cross section of FIGURE 8 one lamination 38 is already depicted within the housing while a second lamination 38 is shown being disposed partly within the housing, the lower portion of which as depicted is disposed in the loading groove or recess 50 and the top portion as depicted being abutted against the axial face of the lip 45. A careful study of FIGURES 7-9 will reveal that the lamination 38 may be inserted into the housing due to the loading groove 50 permitting a radial shifting of the lamination relative to the inner diameter 36 of the housing. For example in FIGURE 9 the lamination 38 is abutted snugly against the bottom or outermost portion of the recess 50 on the right hand side of the housing as viewed in the figure.

Figure 5:
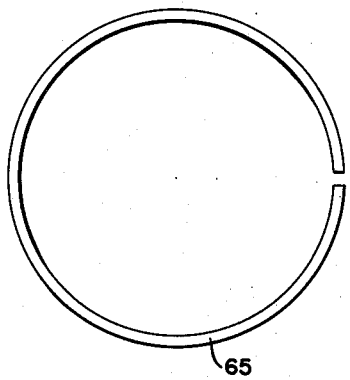
FIGURE 5 is a plan view of a typical spring washer means which may be used with the present invention.
Figure 6:
FIGURE 6 is a side view of the spring washer shown in FIGURE 5.

The assembly of the laminations takes place sequentially, the laminations being inserted into the housing one at a time. In the preferred embodiment, a spring washer 65 depicted in FIGURES 5 and 6 is first placed within the housing and is abutted against the inside surface 66 of the end bell (see FIGURE 2). The laminations are then inserted one at a time in a sequential manner. Suitable means may be used for bonding the individual laminations one to another and to the housing or end bell per se. Various techniques can be used in this regard, one technique having been found very successful being the use of an epoxy bonding compound. It will be understood that the scope of the invention covers a wide variety of techniques for bonding the laminations and housing together into a unitary rotor assembly.

The spring washer 65 is capable of being axially compressed a slight amount which facilities placing an axial loading on the assembled laminations. As the final lamination is inserted into the housing, a slight amount of axial force may have to be applied to it in order to compress axially the spring washer 65.

It has been found that the splits 42 in the ring laminations 38 does not have any significant detrimental effect on the operation of the motor.

While we have shown and described a specific embodiment of this invention, further modifications and improvements will occur to those skilled in the art. One thing that should be fully understood is that the invention has broader applications beyond the specific use in a gas bearing gyro spin motor. We desire it to be understood, therefore, that this invention is not limited to the particular form shown and we intend in the appended claims to cover all modifications which do not depart from the spirit and scope of this invention.

We claim as our invention:

1. In control apparatus: the combination of a hollow cylindrically shaped housing member having means at one end thereof extending radially inwardly a substantial amount so as to prevent the insertion of a circular object having a diameter substantially the same as the inner diameter of said housing, said housing being further characterized by having a circular lip on the other end thereof extending radially inwardly, the diameter of said lip being less than the inner diameter of said housing, and an internal circumferential groove having a diameter greater than the inner diameter of said housing substantially immediately adjacent to said lip, the diameters of said lip and said groove being characterized so that the dimension from a point on the periphery of said groove to a point on the periphery of said lip 180° circumferentially spaced therefrom is at least substantially the same as the inner diameter of said housing; a plurality of split ring laminations having an outer diameter substantially the same as the inner diameter of said housing positioned within said housing; and means for maintaining said laminations in rigid assembled relationship with said housing.

2. In control apparatus: the combination of a hollow cylindrically shaped housing member having means at one end thereof extending radially inwardly a substantial amount, a circular lip on the other end thereof extending radially inwardly, the diameter of said lip being less than the inner diameter of said housing, and an internal circumferential groove having a diameter greater than the inner diameter of said housing substantially axially adjacent to said lip, the diameters of said lip and said groove being characterized so that the dimension from a point on the periphery of said groove to a point on the periphery of said lip 180° circumferentially spaced therefrom is at least substantially the same as the inner diameter of said housing; a plurality of split ring laminations having an outer diameter substantially the same as the inner diameter of said housing positioned within said housing; and means for maintaining said laminations in rigid assembled relationship with said housing.

3. In control apparatus: the combination of a hollow cylindrically shaped housing member having means at one end thereof extending radially inwardly a substantial amount, a circular lip on the other end thereof extending radially inwardly, the diameter of said lip being less than the inner diameter of said housing, and an internal recess in said housing substantially immediately adjacent to said lip, said lip and said recess being characterized so that the dimension from a point within said recess to a point on the periphery of said lip 180° circumferentially spaced therefrom is at least substantially the same as the inner diameter of said housing; a plurality of split ring laminations having an outer diameter substantially the same as the inner diameter of said housing positioned within said housing; and means for maintaining said laminations in rigid assembled relationship with said housing.

4. In control apparatus: a hollow cylindrically shaped housing member having means at one end thereof extending radially inwardly a substantial amount relative to the inner diameter of said housing, a lip on the other end extending radially inwardly from said inner diameter of said housing and an internal recess in said housing substantially immediately adjacent to said lip, said lip and said recess being characterized so that the dimension from a point within said recess to a point on said lip is at least substantially the same as the inner diameter of said housing; a plurality of split ring laminations having an outer diameter substantially the same as the inner diameter of said housing positioned within said housing; and means for maintaining said laminations in rigid assembled relationship with said housing.

5. In control apparatus: a hollow cylindrically shaped housing member having first means at one end thereof extending radially inwardly a substantial amount relative to the inner diameter of said housing, second means on the other end extending radially inwardly from said inner diameter of said housing, and an internal recess in said housing substantially axially adjacent to said second means, said second means and said recess being characterized so that the dimension from a point within said recess to a point on said second means is at least substantially the same as the inner diameter of said housing; a plurality of split ring laminations having an outer diameter substantially the same as the inner diameter of said housing positioned within said housing; and means for maintaining said laminations in rigid assembled relationship with said housing.

6. In control apparatus: a hollow cylindrically shaped housing member having means at one end thereof extending radially inwardly a substantial amount relative to the inner diameter of said housing, a lip on the other end extending radially inwardly from said inner diameter of said housing, and internal recess means in said housing substantially axially adjacent to said lip, said lip and said recess means being characterized so that the dimension from a point within said recess means to a point on said lip is at least substantially the same as the inner diameter of said housing.

7. In control apparatus: a hollow cylindrically shaped housing member having first means at one end thereof extending radially inwardly a substantial amount relative to the inner diameter of said housing, second means on the other end extending radially inwardly from said inner diameter of said housing, and internal recess means in said housing substantially axially adjacent to said second means, said second means and said recess means being characterized so that the dimension from a point within said recess means to a point on said second means is at least substantially the same as the inner diameter of said housing.

8. In control apparatus: a cylindrically shaped housing member having first means at one end thereof extending radially a substantial amount relative to the diameter of said housing, second means on the other end extending radially from said diameter of said housing; and recess means in said housing substantially axially adjacent to said second means, said second means and said recess means being characterized so that the dimension from a point within said recess means to a point on said second means is at least substantially the same as said diameter of said housing; a plurality of split ring laminations having a diameter substantially the same as said diameter of said housing assembled with said housing and located between said first and second means; and means for maintaining said laminations in rigid assembled relationship with said housing.

9. In control apparatus: a cylindrically shaped housing member having first means at one end thereof extending radially a substantial amount relative to the diameter of said housing, second means on the other and extending radially from said diameter of said housing; and recess means in said housing substantially axially adjacent to said second means, said second means and said recess means being characterized so that the dimension from a point within said recess means to a point on said second means is at least substantially the same as said diameter of said housing; and a split ring lamination having a diameter substantially the same as said diameter of said housing assembled with said housing.

10. In control apparatus: a cylindrically shaped housing member having first means at one end thereof extending radially a substantial amount relative to the diameter of said housing, second means on the other end extending radially from said diameter of said housing; and recess means in said housing substantially axially adjacent to said second means, said second means and said recess means being characterized so that the dimension from a point within said recess means to a point on said second means is at least substantially the same as said diameter of said housing.

11. In control apparatus: a cylindrically shaped housing member having first means at one end thereof extending radially a substantial amount relative to the diameter of said housing, second means on the other end extending radially from said diameter of said housing; and recess means in said housing substantially axially adjacent to said second means, said second means and said recess means being characterized so that the dimension from a point within said recess means to a point on said second means is at least substantially the same as said diameter of said housing; a plurality of split ring laminations having a diameter substantially the same as said diameter of said housing assembled with said housing and located between said first and second means; and means including spring means for maintaining said laminations in assembled relationship with said housing.

12. In a gas bearing gyro spin motor: a hollow cylindrically shaped housing member having means at one end thereof extending radially inwardly a substantial amount relative to the inner diameter of said housing, axial thrust bearing means on the other end extending radially inwardly from said inner diameter of said housing, and an internal recess in said housing substantially axially adjacent to aid thrust bearing means, said thrust bearing means and said recess being characterized so that the dimension from a point within said recess to a point on said thrust bearing means is at least substantially the same as the inner diameter of said housing; a plurality of split ring laminations having an outer diameter substantially the same as the inner diameter of said housing positioned within said housing; and means for maintaining said laminations in assembled relationship with said housing.

13. The method of assembling a hollow cylindrically shaped housing member having first means at one end thereof extending radially inwardly a substantial amount relative to the inner diameter of said housing; second means on the other end thereof extending radially inwardly from said inner diameter of said housing, and internal recess means in said housing substantially axially adjacent to said second means, said second means and said recess means being characterized so that the dimension from a point within said recess means to a point on said second means is at least substantially the same as the inner diameter of said housing; and a plurality of split ring laminations having an outer diameter substantially the same as the inner diameter of said housing, said method comprising the steps of: axially displacing the ends of one of said split ring laminations, inserting one of said ends of said one of said laminations into said hollow housing member through said other end thereof and into said recess means, then applying successive inward radial forces to the portion of said lamination remaining outside of said housing progressing toward the other of said ends of said one of said laminations so as to move the entire lamination into said housing, and then bonding said lamination to said housing.

14. The method of assembling a hollow cylindrically shaped housing member having means at one end thereof extending radially inwardly a substantial amount, a circular lip on the other end thereof extending radially inwardly, the diameter of said lip being less than the inner diameter of said housing, and an internal circumferential groove having a diameter greater than the inner diameter of said housing substantially axially adjacent to said lip, the diameters of said lip and said groove being characterized so that the dimensions from a point within said groove to a point on the periphery of said lip 180° circumferentially spaced therefrom is at least substantially the same as the inner diameter of said housing; and a plurality of split ring laminations having an outer diameter substantially the same as the inner diameter of said housing, said method comprising the steps of: axially displacing the ends of one of said split ring laminations, inserting one of said ends of said one of said laminations into said hollow housing member through said other end thereof and into said groove, then applying successive inward radial forces to the portion of said lamination remaining outside of said housing progressing toward the other of said ends of said one of said laminations, and then bonding said lamination to said housing.

15. The method of assembling a cylindrically shaped housing member having first means at one end thereof extending radially a substantial amount relative to the diameter of said housing; second means on the other end thereof extending radially from said diameter of said housing; and recess means in said housing substantially axially adjacent to said second means, said second means and said recess means being characterized so that the dimension from a point within said recess means to a point on said second means is at least substantially the same as said diameter of said housing; and a plurality of split ring laminations having a diameter substantially the same as said diameter of said housing, said method comprising the steps of: axially displacing the ends of one of said split ring laminations, inserting one of said ends of said lamination into said recess means, and then applying radial force to said lamination.

16. The method of assembling a hollow cylindrically shaped housing member having first means at one end thereof extending radially inwardly a substantial amount relative to the inner diameter of said housing; second means on the other end thereof extending radially inwardly from said inner diameter of said housing, and internal recess means in said housing substantially axially adjacent to said second means, said second means and said recess means being characterized so that the dimension from a point within said recess means to a point on said second means is at least substantially the same as the inner diameter of said housing; and a split ring lamination having an outer diameter substantially the same as the inner diameter of said housing, said method comprising the steps of: axially displacing the ends of said split ring lamination, inserting one of said ends of said lamination into said hollow housing member through said other end thereof and into said recess means, then applying successive inward radial forces to the portion of said lamination remaining outside of said housing progressing toward the other of said ends of said lamination so as to move the entire lamination into said housing, and then bonding said lamination to said housing.

References Cited in the file of this patent
UNITED STATES PATENTS

| | | |
|---|---|---|
| 1,538,187 | Herrick | May 19, 1925 |
| 2,354,551 | Sawyer | July 25, 1944 |
| 2,783,404 | Appenzeller | Feb. 26, 1957 |
| 2,790,918 | Soran | Apr. 30, 1957 |